Figure 1:
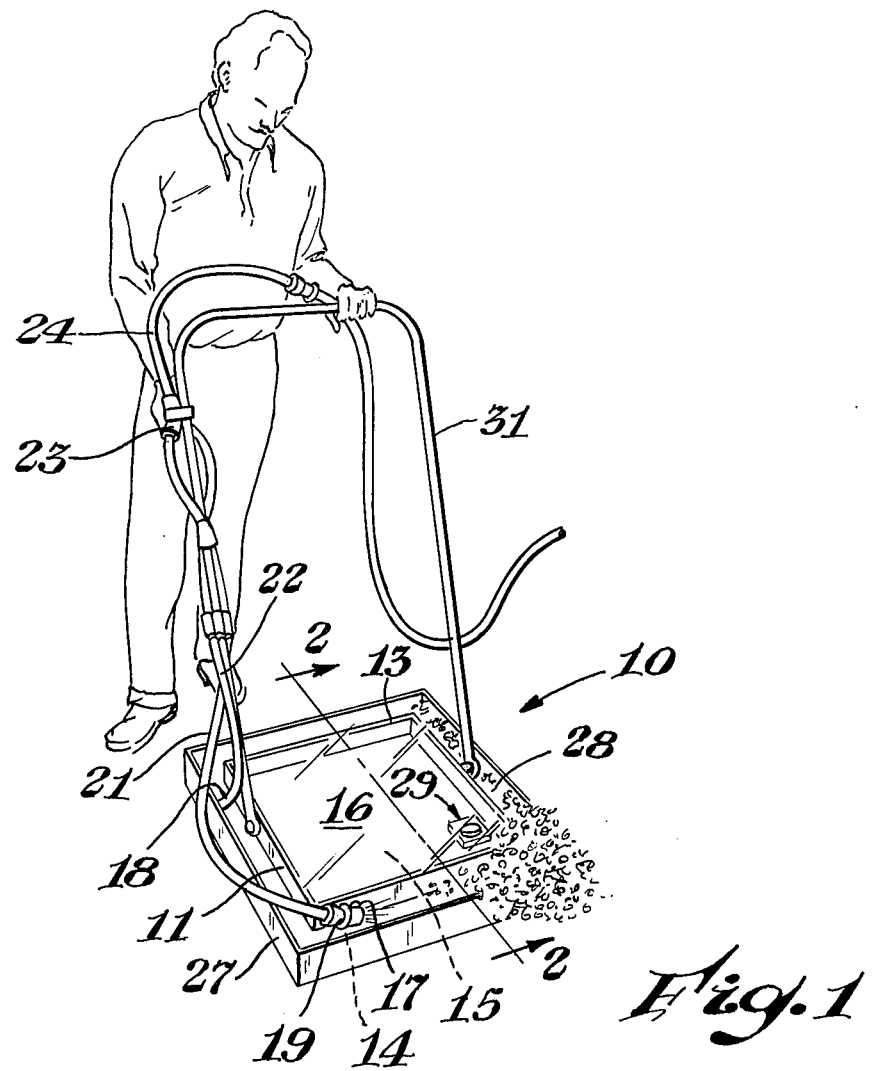

United States Patent [19]

Zachary

[11] 4,104,905

[45] Aug. 8, 1978

[54] LEAK DETECTING APPARATUS

[75] Inventor: Richard E. Zachary, Ethel, La.

[73] Assignee: The Dow Chemical Company, Midland, Mich.

[21] Appl. No.: 750,067

[22] Filed: Dec. 13, 1976

[51] Int. Cl.² .............................................. G01M 3/06
[52] U.S. Cl. ....................................................... 73/40
[58] Field of Search ................... 73/40, 40.7, 46, 49.2; 417/180

[56] References Cited

U.S. PATENT DOCUMENTS

| 1,467,312 | 9/1923 | Ewing et al. ........................ 417/180 |
| 1,804,569 | 5/1931 | Taddiken ......................... 417/180 X |
| 1,931,502 | 10/1933 | Markle et al. ........................ 73/46 X |
| 2,108,176 | 2/1938 | Newby ................................. 73/40 X |
| 2,633,739 | 4/1953 | Potts et al. ........................ 73/49.5 X |
| 2,679,747 | 6/1954 | Andrus ................................... 73/40 |

FOREIGN PATENT DOCUMENTS 215,694  7/1941  Switzerland ................................. 73/40

*Primary Examiner*—Richard C. Queisser
*Assistant Examiner*—John P. Beauchamp

[57] ABSTRACT

A leak detecting apparatus comprises an opened-bottom box having a peripheral seal and a transparent top. Air is removed from the box by means of an ejector to provide a vacuum to inspect membrane for leaks and water pumped into the box to permit easy movement over membrane being tested.

6 Claims, 2 Drawing Figures

U.S. Patent  Aug. 8, 1978  4,104,905

LEAK DETECTING APPARATUS

Oftentimes, it is desirable to inspect membranes such as pond liners and water-impermeable membranes disposed on roof decks for leakage. Generally such an inspection is made immediately after installation of such a membrane. A number of devices have been developed for testing of weld seams such as are disclosed in U.S. Pat. No. 2,679,747 issued to O. E. Andrus. However, such devices generally are inconvenient and tiresome for the inspection or testing of generally horizontally-disposed membranes such as large plastic sheets. Such weld testing devices generally are a hollow box having a flexible seal and lower open bottom and a transparent top and a liquid is disposed within the box, vacuum applied and if bubbles appear the location of the weld fault can readily be determined. Such equipment is generally awkward and inconvenient for use on membranes such as pond liners and roof membranes.

It would be desirable if there were available an improved leak testing apparatus for horizontally disposed sheets.

It would also be desirable if there were available an improved leak testing apparatus for the testing of horizontally disposed sheets such as plastic and rubber which required only a water supply line.

It would also be desirable if there were available such a testing apparatus which could be conveniently operated by one person.

These benefits and other advantages in accordance with the present invention are achieved in an apparatus for the testing of a generally horizontally disposed water-impermeable membrane having water thereon, the apparatus comprising a hollow housing, the hollow housing having an upper end and a lower end, the upper end being closed and having a transparent portion, the lower end being open and having disposed thereabout a flexible sealing member adapted to engage a membrane being tested, the hollow housing defining an inner cavity in full communication with the open end, a gas discharge means disposed adjacent the upper end of the housing, and a water inlet means within the housing in communication with the cavity, an ejector in operative combination with the gas discharge means, a selective valving means to selectively (a) supply water to the water inlet or (b) supply water to the ejector to thereby exhaust air from the cavity or (c) prevent flow of water to the water inlet means or the ejector.

Figure 2:
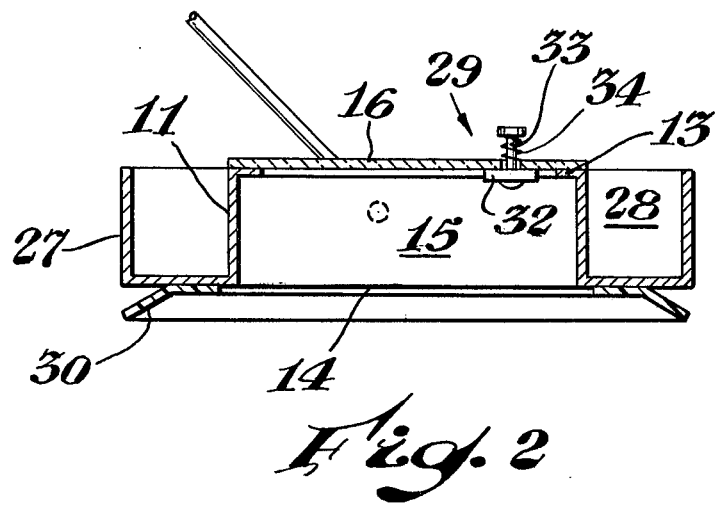

Further features and advantages of the present invention will become more apparent from the following specification taken in connection with the Drawing wherein:

FIG. 1 schematically depicts an isometric view of a leak detector in accordance with the present invention; and FIG. 2 depicts a sectional view of a leak detector in accordance with the present invention taken along the line 2—2 of FIG. 1.

In FIG. 1 there is illustrated an isometric view of a leak detector in accordance with the present invention generally designated by the reference numeral 10. The leak detector 10 comprises in cooperative combination a hollow housing 11. The hollow housing 11 has an upper end 13 and a lower end 14. The housing 11 defines a generally internal downwardly facing cavity 15. The upper end 13 comprises a transparent panel 16 which provides a generally gas-tight seal. The housing 11 has a gas outlet 17 disposed generally adjacent the upper end 13 and a liquid inlet 18. The gas outlet 17 is in operative combination with an ejector 19. A liquid supply conduit 21 is in operative combination with the motive fluid inlet of the ejector 19. A second water supply conduit 22 is in operative communication with the inlet or water inlet 18. A valving means 23 which beneficially is a three-way cock with a two-port plug or alternatively two valves in parallel, is in operative connection with conduits 21 and 22. The valving means 23 is also in operative connection with a water supply means or hose 24. About the housing 11 is disposed a flange 27 which in combination with the housing 11 defines an open-topped upwardly facing generally annular trough or ballast receiving means 28. The ejector 19 in operation discharges water into the trough 28. A pressure-relief valve 29 is disposed in the transparent panel 16. A handle 31 is pivotally affixed to the housing 11 and adapted to be grasped by a person standing in an upright position as depicted in FIG. 1. Conveniently, the handle is of a U-shaped configuration wherein the legs are pivotally affixed to opposite sides of the housing 11.

In FIG. 2 there is depicted a sectional view of the leak detector of FIG. 1 taken along the line 2—2 thereof. FIG. 2 depicts the location of a generally annular sealing member 30 which surrounds the open end 14 of the housing 11. The sealing member 30, as depicted in FIG. 2, is a generally annular resilient sheet such as rubber, polyvinylchloride, or the like, adapted to engage a membrane being tested. The pressure relief valve 29 comprises a valving member 32 disposed within the cavity 15. The valving member 32 is affixed to a valve stem 33 which passes through the transparent panel 16 and is resiliently tensioned upwardly by means of a spring 34.

In operation of the apparatus of the invention as designated in FIGS. 1 and 2, the leak detector is placed upon the membrane to be tested in such a manner that the sealing member 30 is resting on the surface to be tested. Water is supplied to the water supply conduit 24 usually under a pressure of from about 20 to 40 pounds per square inch which is usually available from most water mains. The valve 23 is actuated to provide water to conduit 22 and in a quantity sufficient to wet the immediate area which is to be tested. Water is then supplied to the ejector 19 through conduit 21, beneficially in a quantity sufficient to fill the trough 28 and provide additional force to insure that the sealing member 30 is in sealing engagement with the membrane being tested. The pressure relief valve 29 permits air to enter the chamber 15 when a predetermined reduced pressure in the chamber has been reached. Without the pressure relief means, rupture of the transparent panel 16 can occur if the ejector 19 is sufficiently efficient. As the pressure is reduced by the ejector 19, the person inspecting the membrane to be tested observes the water covered surface within the chamber 15 and any rising bubbles will indicate the location of a leak. When the area within the housing 11 has been inspected for leaks, the valve 23 is actuated to cause water to flow through conduit 22 into the inlet 18 and cause the pressure within the chamber to become superatmospheric. One then has what might be considered to be a hydraulically operated ground effect vehicle and the apparatus can readily be moved with little physical effort to the next area to be inspected and the process of evacuating or reducing the pressure within chamber 15 by means of the ejector 19 and the operations repeated until the entire inspection is completed. In the illustrated embodiment of the invention, the trough 28 provides a convenient means of supplying weight to assure that the sealing means 30 conforms to irregularities in the membrane being inspected. The additional weight provides little inconvenience in operation as the apparatus, when operating as a hydraulic ground effect vehicle, offers very little resistance to movement. Conveniently, the apparatus can be made also that it is lightweight and readily transported when not in use. The apparatus can be readily fabricated from sheet metal such as galvanized steel, aluminum, or the like, or alternatively it can be made entirely of plastic sheet or by injection molding of appropriate plastic materials. The resilient sealing means 30, if desired, for inspection of particularly rough surfaces can be of a closed-cell foam such as polyethylene foam; however, for most applications the configuration of the seal 30 as depicted in FIG. 2 is highly satisfactory when used on smooth plastic sheet. The rectangular configuration as depicted in FIG. 1 is usually most convenient for most applications, however, circular, elliptical, arcuate, elongate and like configurations which are best suited to the configuration of the surface or membranes being inspected may be used.

In FIG. 2 the sealing means 30 is depicted as a flange affixed to a rigid bottom of the trough 28. In an alternative embodiment of the invention, the bottom of the trough 28 may be of a flexible rubber-like material such as that of the sealing means 30 and a slit formed in the bottom thereof, the slit being formed generally parallel and spaced from the periphery of the trough, for example, midway between the side walls of the trough 28. Such an arrangement is particularly convenient when the membrane being tested has relatively minor irregularities, and when the water supply to the trough is cut off it may be readily drained by lifting of the apparatus to an extent sufficient to permit water to escape through the slit. In such an instance, it is generally desirable to provide a rigid connection between the housing 11 and the flange 27, for example, by means of a bolt and spacer on each of the four sides. Alternatively, a riveted or welded web may be employed. Depending on the variety of ejector, such as the ejector 19, employed, it may be desirable to position the ejector adjacent the lower portion of the housing 11 or adjacent the upper portion depending on whether the particular ejector is more suited for the removal of air or water therefrom.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. An apparatus for the testing of a generally horizontally disposed water-impermeable membrane, the apparatus comprising a hollow housing, the hollow housing having an upper end and a lower end, the upper end being closed and having an transparent portion, the lower end being open and having disposed thereabout a flexible sealing member adapted to engage a membrane being tested, the hollow housing defining an inner cavity in full communication with the open end, a gas discharge means disposed adjacent the upper end of the housing, and a water inlet means within the housing in communication with the cavity, an ejector in operative combination with the gas discharge means, a selective valving means to selectively (a) supply water to the water inlet means or (b) supply water to the ejector to thereby exhaust air from the cavity or (c) prevent flow of water to the water inlet means or the ejector, a liquid ballast receiving means being a trough peripherally disposed about and affixed to the hollow housing.

2. The apparatus of claim 1 wherein the ejector discharges into the trough.

3. The apparatus of claim 1 wherein a pressure-relief valve is in communication with the interior of the hollow housing to limit the reduced pressure generated therein by the ejector.

4. The apparatus of claim 1 wherein the housing is a generally rectangular configuration.

5. The apparatus of claim 1 including a handle affixed thereto adapted to be grasped by a person standing in an upright position.

6. An apparatus for the testing of a horizontally disposed water-impermeable membrane, the apparatus comprising a hollow rectangular housing having a generally peripheral upwardly-facing trough disposed thereabout and affixed thereto, the hollow housing having an upper end and a lower end, the upper end being closed by a transparent portion, the lower end being open and having disposed thereabout a flexible sealing member adapted to engage a membrane being tested, the hollow housing defining an inner cavity in full communication with the open end, a gas discharge means disposed adjacent the upper end of the housing and a water inlet means within the housing in communication with the cavity, an ejector in operative combination with the gas discharge means, the ejector being adapted to discharge into the trough a selective valving means to selectively (a) supply water to the water inlet means or (b) supply water to the ejector to thereby exhaust air from the cavity or (c) prevent flow of water to the water inlet means or the ejector, a handle affixed to the housing and adapted to be grasped by a person standing in an upright position and a pressure-relief valve in communication with the inner cavity to permit air to enter the cavity when a predetermined subatmospheric pressure is reached within the cavity.

* * * * *